(12) United States Patent
Oda et al.

(10) Patent No.: US 10,239,474 B1
(45) Date of Patent: Mar. 26, 2019

(54) CORRUGATED TUBE AND WIRE HARNESS

(71) Applicant: Yazaki Corporation, Tokyo (JP)

(72) Inventors: Kyohei Oda, Susono (JP); Masahisa Sugimoto, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/043,734

(22) Filed: Jul. 24, 2018

(30) Foreign Application Priority Data

Sep. 4, 2017 (JP) .................................. 2017-169193

(51) Int. Cl.
*B60R 16/02* (2006.01)
*B60R 16/027* (2006.01)
*H02G 3/04* (2006.01)
*H01B 7/00* (2006.01)

(52) U.S. Cl.
CPC ........ *B60R 16/0215* (2013.01); *B60R 16/027* (2013.01); *H01B 7/0045* (2013.01); *H02G 3/0468* (2013.01)

(58) Field of Classification Search
CPC ...... B60R 16/027; H02G 3/0468; H02G 3/04; H02G 3/0462; H01B 7/0045
See application file for complete search history.

(56) References Cited

U.S. PATENT DOCUMENTS

| 2010/0205771 | A1* | 8/2010 | Pietryga | H02G 3/0468 16/2.2 |
| 2015/0325989 | A1* | 11/2015 | Sekino | H02G 3/0468 174/68.3 |
| 2017/0072878 | A1 | 3/2017 | Mochizuki et al. | |

FOREIGN PATENT DOCUMENTS

JP 2015-228759 A 12/2015

* cited by examiner

*Primary Examiner* — Hoa C Nguyen
*Assistant Examiner* — Amol H Patel
(74) *Attorney, Agent, or Firm* — Sughrue Mion, PLLC

(57) ABSTRACT

A corrugated tube of the present invention has a rigid portion, a bellows portion, and a gradually varying portion. The rigid portion is formed in an end portion of the tube, and has a first half-circumference portion having a recess/projection-repetitive structure in which grooves and projection strips are arranged alternately in the tube longitudinal direction and a second half-circumference portion having a straight structure with no grooves or projection strips. The bellows portion is formed in a center portion of the tube and has the first and the second half-circumference portions both of which have a recess/projection-repetitive structure. The gradually varying portion is formed between the rigid portion and the bellows portion, and has the first half-circumference portion having the recess/projection-repetitive structure and the second half-circumference portion having the gradually varying structure in which the height of the projection strip decreases gradually from the bellows portion to the rigid portion.

3 Claims, 6 Drawing Sheets

CORRUGATED TUBE AND WIRE HARNESS

CROSS-REFERENCES TO RELATED APPLICATIONS

This application is a-based on and claims priority from Japanese Patent Application No. 2017-169193 filed on Sep. 4, 2017, the entire contents of which are incorporated herein by reference.

BACKGROUND OF THE INVENTION

1. Field of the Invention

The present invention relates to a corrugated tube and a wire harness.

2. Description of the Related Art

Conventionally, a corrugated tube is known which have a tubular shape and have a bellows portion in which grooves and projection strips extending in the tube circumferential direction are arranged alternately in the tube longitudinal direction and through which conductor lines are inserted. The corrugated tubes such that is used for, for example, a slide door of a vehicle in a state that electric cables are inserted through them as conductor lines. The corrugated tube is made of a synthetic resin, and has a role of protecting, safely, the electric cables disposed inside from, for example, outside interference. Further, a wire harness is constricted by inserting a conductor line such as an electric cable into the corrugated tube.

Herein, the corrugated tube used in a movable portion such as a slide door has a portion that is not desired to be bent, a portion that is desired to be bent more than a prescribed curvature, and a portion that is desired to be bent less than the prescribed curvature, and its route is restricted accordingly by fixing it to a vehicle body or the like at several locations with prescribed fixing members. However, to restrict its route, such a corrugated tube needs to be fixed to a vehicle body or the like with prescribed fixing members, and the fixing work is a factor in increasing the number of work steps in mounting the wire harness.

In view of the above, a corrugated tube has been proposed which is equipped a first bellows portion, a second bellows portion, and a straight portion (for example, see Patent document 1). In this corrugated tube, the pitch in the first bellows portion, that is, the distance from one groove, past one projection strip, to an adjacent groove is set at a first distance. In the second bellows portion, the pitch is set at a second distance that is longer than the first distance. The straight portion is not formed with any grooves or projection strips and has a straight structure. Capable of accommodating a location where the corrugated tube is not desired to be bent, a location where the corrugated tube is desired to be bent more than a prescribed curvature, and a location where the corrugated tube is desired to be bent more than the prescribed curvature, this corrugated tube can reduce the number of fixing members used and thereby suppress increase of the number of work steps.

Patent document 1: JP-A-2015-228759

SUMMARY OF THE INVENTION

However, in the corrugated tube disclosed in Patent document 1, the straight portion is formed at a tube end portion. As a result, it is difficult to attach a rotary clamp to an end portion of the corrugated tube using grooves and projection strips. In addition, the corrugated tube may be recognized visually by a user when the slide door is fully open. However, the corrugated tube which has the first bellows portion, the second bellows portion, and the straight portion has no sense of unity in shape in the longitudinal direction and is thus inferior in design performance.

In order to solve the above problems, an object of the invention is therefore to provide a corrugated tube and a wire harness capable of suppressing increase of the number of work steps by reducing the number of fixing members used, facilitating attachment of a rotary clamp, and suppressing reduction of design performance.

A corrugated tube of the present invention has a tubular shape, and arranges a conductor line inside thereof. The corrugated tube includes which is formed in an end portion in a longitudinal direction of the tube, and has a first half-circumference portion having a recess/projection-repetitive structure in which grooves and projection strips extending in a circumferential direction of the tube are arranged alternately in the longitudinal direction of the tube and a second half-circumference portion that is the remaining part other than the first half-circumference portion and has a straight structure having no grooves or projection strips; a bellows portion which is formed in a center portion in the longitudinal direction of the tube, and has the first half-circumference portion and the second half-circumference portion both of which have the recess/projection-repetitive structure; and a gradually varying portion which is formed between the rigid portion and the bellows portion in the longitudinal direction of the tube and has the first half-circumference portion having the recess/projection-repetitive structure and the second half-circumference portion having a gradually varying structure in which the depth of the groove and the height of the projection strip decrease gradually from the bellows portion to the rigid portion.

In this corrugated tube, the rigid portion can be made a portion that is highest in stiffness because the first half-circumference portion has a recess/projection-repetitive structure and the second half-circumference portion has a straight structure. The bellows portion can be made a portion that is highest in bendability because both of the first half-circumference portion and the second half-circumference portion have a recess/projection-repetitive structure. The gradually varying portion can be made a portion that is at a medium level in stiffness and bendability because the first half-circumference portion has a recess/projection-repetitive structure and the second half-circumference portion has a gradually varying structure in which the height of the projection strip as measured from the bottom of the groove decreases gradually. Thus, capable of accommodating a location where the corrugated tube is not desired to be bent, a location where the corrugated tube is desired to be bent more than a prescribed curvature, and a location where the corrugated tube is desired to be bent less than the prescribed curvature, the corrugated tube can reduce the number of fixing members used and thereby suppress increase of the number of work steps.

In addition, since the first half-circumference portion of the rigid portion which is a tube end portion has a recess/projection-repetitive structure, it is not difficult to attach a rotary clamp to it. Furthermore, the first half-circumference portions of all of the rigid portion, the gradually varying portion, and the bellows portion have a recess/projection-repetitive structure, reduction in design performance can be suppressed by installing the corrugated tube so that this surface is visually recognized by a user.

That is, this corrugated tube makes it possible to suppress increase of the number of work steps by reducing the number of fixing members used, facilitate attachment of a rotary clamp, and suppress reduction of design performance.

In the above corrugated tube, it is preferable that the second half-circumference portion of each of the rigid portion and the gradually varying portion have slant portions where the height, as measured from the bottom of the groove, of the projection strip extending from the first half-circumference portion decreases gradually in the circumferential direction.

According to this corrugated tube, since the second half-circumference portions of the rigid portion and the gradually varying portion have the slant portions in which the height of the projection strip as measured from the bottom of the groove decreases gradually in the circumferential direction, portions that are made thin when the corrugated tube is molded are not prone to be formed around the boundaries between the recess/projection-repetitive structures and the second half-circumference portions, whereby reduction in impact resistance can be suppressed.

The invention also provides a wire harness which is routed between a vehicle main body and a slide door, characterized by comprising either of the above-described corrugated tube; and a conductor line disposed inside the corrugated tube, further characterized in that the first half-circumference portions of the corrugated tube are directed a little upward on the side of an opening of the slide door when the slide door is fully open.

In this wire harness, in a state that the slide door in fully open, the first half-circumference portions come to be directed a little upward on the side of the opening of the slide door. As a result, when a user has fully opened the slide door and is likely to visually recognize the corrugated tube, the first half-circumference portions face the side of the point of view of the user. Reduction in design performance of the wire harness is thus suppressed.

The invention makes it possible to provide a corrugated tube and a wire harness capable of suppressing increase of the number of work steps by reducing the number of fixing members used, facilitating attachment of a rotary clamp, and suppressing reduction of design performance.

DESCRIPTION OF THE PREFERRED EMBODIMENT

Hereafter, the present invention will be described by way of a preferred embodiment. The invention is not limited to the following embodiment, and various modifications can be made as appropriate without departing from the spirit and scope of the invention. In the following embodiment, some portions or components that are employed actually may not be shown in any drawings or described; as for the details of techniques relating to such omitted portions or components, it goes without saying that known techniques can be applied as appropriate to those portions or components as long as they are not contradictory to the following description.

Figure 1:
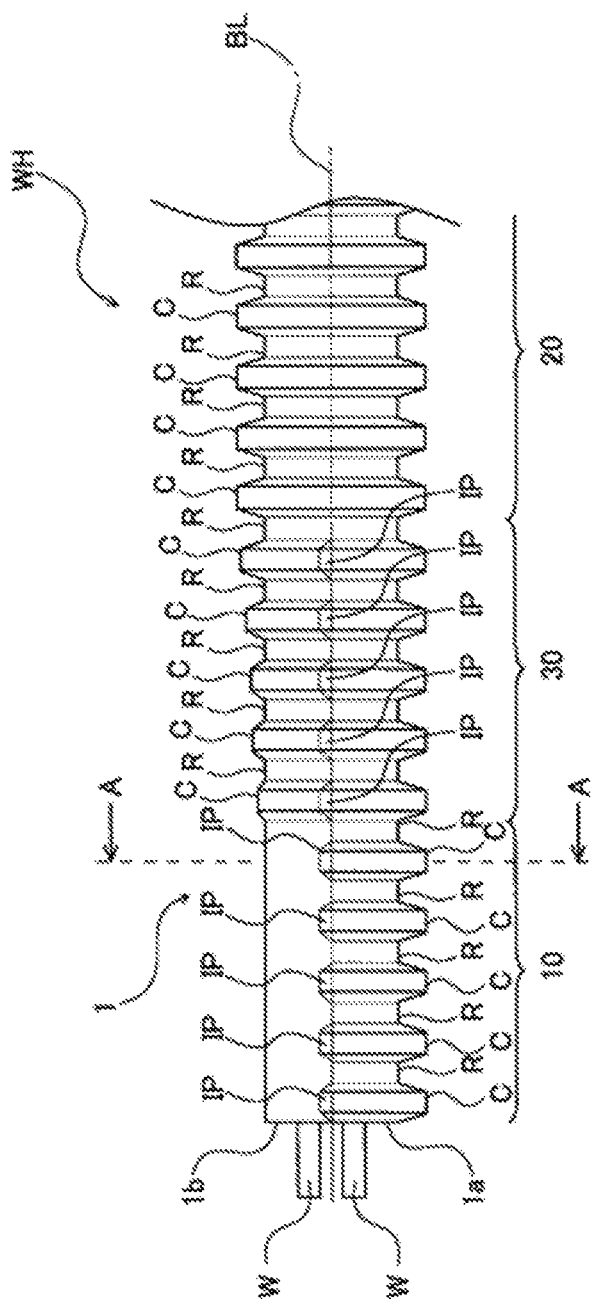
FIG. 1 is a side view showing a wire harness including a corrugated tube according to an embodiment of the present invention.

FIG. 1 is a side view showing a wire harness WH including a corrugated tube 1 according to the embodiment of the present invention. The wire harness WH shown in FIG. 1 is routed between a vehicle main body and a slide door. However, the invention is not limited to this case. For example, the wire harness may be routed in other regions.

As shown in FIG. 1, the wire harness WH according to the embodiment of the present invention has a corrugated tube 1 and electric cables (one example of conductor lines) W. The corrugated tube 1 is formed in a tubular shape, and the electric cables W is arranged inside the corrugated tube 1. The corrugated tube 1 may be circular, elliptical, polygonal, or of a like shape in cross section as long as it is tubular. The corrugated tube 1 may either have or not have a cut extending in the longitudinal direction for insertion of the electric cables W.

The corrugated tube 1 has a rigid portion 10, a bellows portion 20, and a gradually varying portion 30.

The rigid portion 10 is a portion formed in a tube end portion (in particular, one end portion to be located on the vehicle main body side). In the rigid portion 10, a first half-circumference portion (lower half portion in FIG. 1) 1a and a second half-circumference portion (upper half portion in FIG. 1) 1b excluding the first half-circumference portion 1a are different from each other in shape. The first half-circumference portion 1a of the rigid portion 10 has a recess/projection-repetitive structure in which grooves R and projection strips C extending in the tube circumferential direction are arranged alternately in the tube longitudinal direction. On the other hand, the second half-circumference portion 1b is not formed with any grooves R or projection strips C and thus has a straight structure. The outer diameter of the second half-circumference portion 1b having a straight structure is the same as that of the grooves R of the first half-circumference portion 1a.

The bellows portion 20 is a portion located on the side of the tube center (in particular, a portion from the tube center to the other end). In the bellows portion 20, the first half-circumference portion 1a and the second half-circumference portion 1b have the same shape, that is, a recess/ projection-repetitive structure in which grooves R and projection strips C are arranged alternately in the tube longitudinal direction.

The gradually varying portion 30 is formed between the rigid portion 10 and the bellows portion 20. In the gradually varying portion 30, the first half-circumference portion 1a and the second half-circumference portion 1b are also different from each other in shape. The first half-circumference portion 1a of the gradually varying portion 30 has a recess/projection-repetitive structure in which grooves R and projection strips C extending in the tube circumferential direction are arranged alternately in the tube longitudinal direction. On the other hand, the second half-circumference portion 1b of the gradually varying portion 30 has a gradually varying structure including grooves R and projection strips C, and the depth of the grooves R and the height of the projection strip C decrease gradually as the positions go from the bellows portion 20 to the rigid portion 10. More specifically, in the embodiment, the first half-circumference portion 1a and the second half-circumference portion 1b have the same radius at the grooves R. In the second half-circumference portion 1b, the height of the projection strip C decreases gradually as the positions goes from the bellows portion 20 to the rigid portion 10. As a result, in the gradually varying portion 30, the depth of the groove R and the height of the projection strip C decrease gradually toward the rigid portion 10.

In the corrugated tube 1 having the above structure, the rigid portion 10 whose second half-circumference portion 1b has a straight structure is highest in stiffness and hence is suitable for use at a location where the corrugated tube 1 is desired not to be bent. Further, the rigid portion 10 is highest in impact resistance. Since its first half-circumference portion 1a has a recess/projection-repetitive structure, a rotary clamp which is attached utilizing recesses and projections can be attached to the rigid portion 10.

Since both of the first half-circumference portion 1a and the second half-circumference portion 1b in the bellows portion 20 have a recess/projection-repetitive structure, the bellows portion 20 is suitable for use at a location where the corrugated tube 1 is desired to be bent more than a prescribed curvature. More specifically, the bellows portion 20 is suitable for use at a location where the corrugated tube 1 is desired to be bent with a steep curve. Further, since the depth of the groove R and the height of the projection strip C decrease gradually in the second half-circumference portion 1b of the gradually varying portion 30, the gradually varying portion 30 is suitable for use at a location where the corrugated tube 1 is desired to be bent less than the prescribed curvature. More specifically, the gradually varying portion 30 is suitable for use at a location where the corrugated tube 1 is desired to be bent with a gentle curve. Further, the gradually varying portion 30 is a portion that is highest in stiffness next to the rigid portion 10 and relatively high in impact resistance.

In addition, since the first half-circumference portion 1a has a recess/projection-repetitive structure in its entirety, that is, from the rigid portion 10 to the bellows portion 20, the shape thereof is unified in this surface of the corrugation tube 1 in the longitudinal direction, and it is superior in design.

Figure 2:
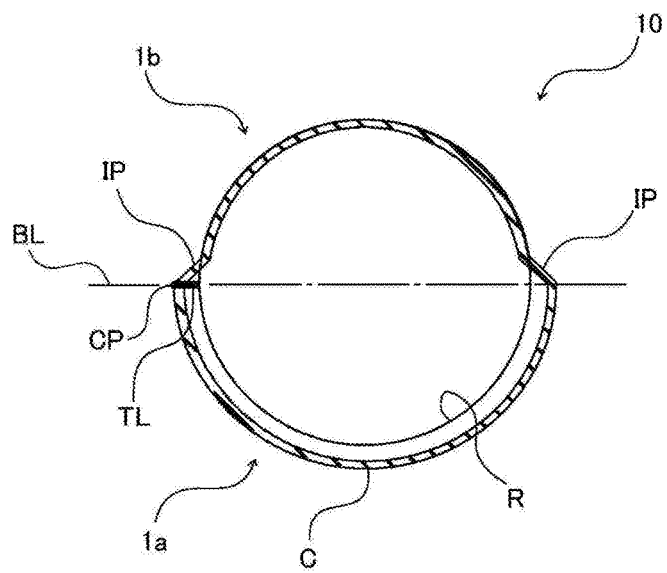
FIG. 2 is a sectional view taken along line A-A in FIG. 1.

FIG. 2 is a sectional view taken along line A-A in FIG. 1. As shown in FIGS. 1 and 2, the second half-circumference portion 1b of the rigid portion 10 has slant portions IP. The slant portions IP is arranged around the boundaries BL with the first half-circumference portion 1a. In the slant portions IP, the height of the projection strip C decreases gradually in the first half-circumference portion 1a. If a structure were employed in which the slant portions IP are not formed as indicated by thick lines TL in FIG. 2, the height of the projection strip C in the first half-circumference portion 1a would decrease steeply around the boundaries BL to form an angled portion CP having an angle that is close to the right angle. There may occur an event that the angled portions CP are made very thin when the corrugated tube 1 is molded, in which case its impact resistance is lowered.

In contrast, in the structure of the embodiment in which the second half-circumference portion 1b of the rigid portion 10 has the slant portions IP, angled portions CP have an obtuse angle. The slant portions IP are not prone to be made thin when the corrugated tube 1 is molded, and hence reduction in impact resistance can be suppressed. For the same reason, the gradually varying portion 30 also has slant portions IP.

Figure 3:
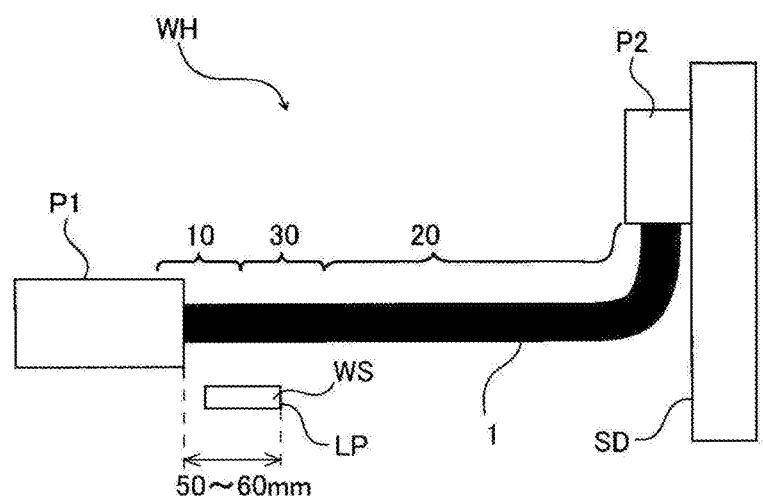
FIG. 3 is a schematic side view showing a state that the wire harness shown in FIG. 1 is attached to a vehicle.

FIG. 3 is a schematic side view showing how the wire harness WH shown in FIG. 1 is attached to a vehicle. FIG. 3 shows a state that the wire harness WH is viewed from a horizontal direction with a slide door SD fully closed.

As shown in FIG. 3, one end of the wire harness WH is connected to a first protector P1 provided on the vehicle main body and its other end is connected to a second protector P2 provided on the slide door SD. A rotary clamp is provided in the first protector P1, and the corrugated tube 1 rotates about the axis of the rotary clamp as the slide door SD is opened or closed.

The corrugated tube 1 is attached to the vehicle in such a manner that the rigid portion 10 is connected to the first protector P1. The wire harness WH according to the embodiment is intended to be installed in the vicinity of a vehicle floor, and a weather strip WS is disposed at a position below the first protector P1 and distant from the first protector P1 by about 50 to 60 mm toward the slide door SD. The length of the rigid portion 10 is such that it does not reach the right end LP of the weather strip WS when viewed from a horizontal direction, and the length of the rigid portion 10 plus the gradually varying portion 30 is such that the right end of the gradually varying portion 30 is located on the right of the right end LP of the weather strip WS.

Next, example workings of the corrugated tube 1 according to the embodiment will be described. Before that, a corrugated tube 100 the whole of which is a bellows portion 20 (i.e., it is provided with neither a rigid portion 10 nor a gradually varying portion 30) will be described as a comparative example.

Figure 4A:
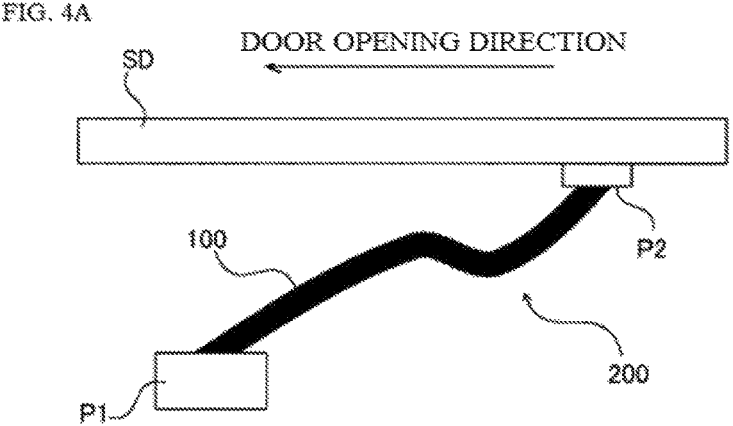
FIG. 4A shows a state of a wire harness including a corrugated tube according to a comparative example, and is a top view showing a state that a slide door is fully closed.
Figure 4B:
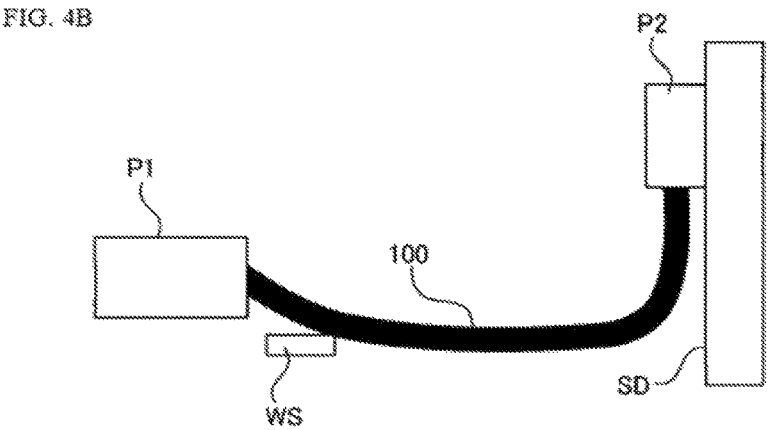
FIG. 4B shows a state of a wire harness including a corrugated tube according to a comparative example, and is a side view showing a state that the slide door is half open.

FIGS. 4A and 4B show how a wire harness 200 including the corrugated tube 100 according to the comparative example is attached to the vehicle. FIG. 4A is a top view showing a state that the slide door SD is fully closed, and FIG. 4B is a side view showing a state that the slide door SD is half open.

As shown in FIG. 4A, in the state that the slide door SD is fully closed, the corrugated tube 100 extends properly. When the slide door SD is opened from this state to a half open state, as shown in FIG. 4B the corrugated tube 100 according to the comparative example gets loose and is warped downward, as a result of which the corrugated tube 100 interferes with the weather strip WS.

Figure 5A:
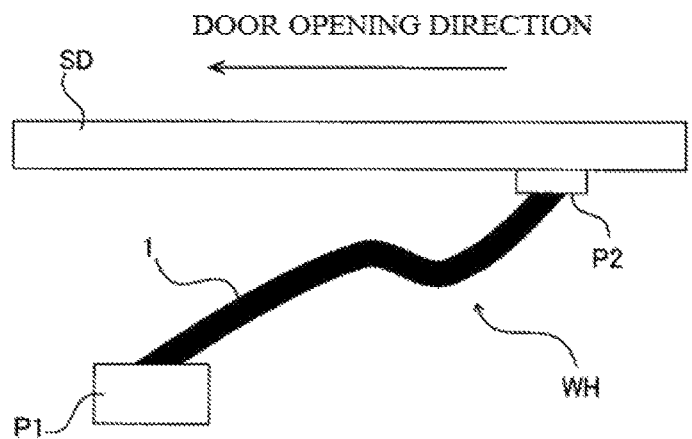
FIG. 5A shows a state of the wire harness including the corrugated tube according to an embodiment of the present invention, and is a top view showing a state that the slide door is fully closed.
Figure 5B:
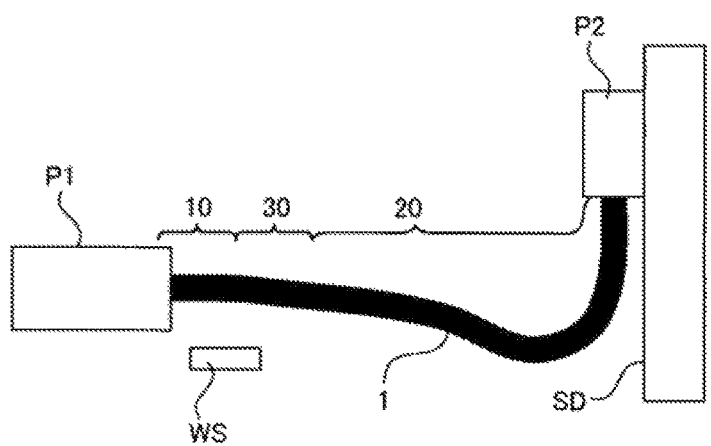
FIG. 5B is shows a state of the wire harness including the corrugated tube according to an embodiment of the present invention, and is a side view showing a state that the slide door is half open.

FIGS. 5A and 5B show how the wire harness WH including the corrugated tube 1 according to the embodiment is attached to the vehicle. FIG. 5A is a top view showing a state that the slide door SD is fully closed, and FIG. 5B is a side view showing a state that the slide door SD is half open.

As shown in FIG. 5A, also in the corrugated tube 1 according to the embodiment, the corrugated tube 1 according to the embodiment extends properly in the state that the slide door SD is fully closed. When the slide door SD is half open, since the corrugated tube 1 has the rigid portion 10, the bellows portion 20, and the gradually varying portion 30 which are arranged in this order from the first protector P1, as shown in FIG. 5B bending of an end portion, attached to the first protector P1, of the corrugated tube 1 is suppressed and hence the corrugated tube 1 is prevented from interfering with the weather strip WS.

Figure 6:
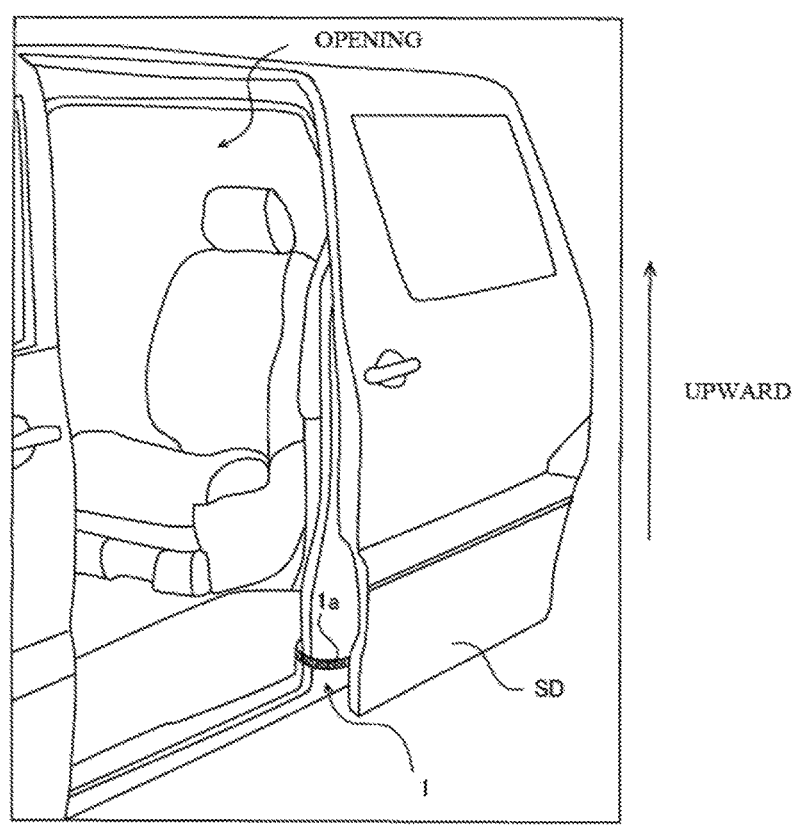
FIG. 6 is a perspective view showing a state that the slide door of the wire harness including the corrugated tube according to the embodiment of the present invention is fully open.

FIG. 6 is a perspective view showing a state that the slide door SD is fully open to which the wire harness WH including the corrugated tube 1 according to the embodiment is attached. As shown in FIG. 6, the corrugated tube 1 according to the embodiment rotates about the axis as the slide door SD is opened. In a state that the slide door SD has been fully opened, the first half-circumference portion 1a of the rigid portion 10 and the gradually varying portion 30 comes to be directed a little upward in the opening of the slide door SD. As a result, a user would visually recognize the corrugated tube 1 as if it were formed only by the bellows portion 20 over its full length. Reduction in design performance is thus suppressed.

As described above, according to the corrugated tube 1 of the embodiment, the rigid portion 10 can be made a portion that is highest in stiffness because the first half-circumference portion 1a has a recess/projection-repetitive structure and the second half-circumference portion 1b has a straight structure. The bellows portion 20 can be made a portion that is highest in bendability because both of the first half-circumference portion 1a and the second half-circumference portion 1b have a recess/projection-repetitive structure. The gradually varying portion 30 can be made a portion that is at a medium level in stiffness and bendability because the first half-circumference portion 1a has a recess/projection-repetitive structure and the second half-circumference portion 1b has a gradually varying structure in which the depth of the groove R and the height of the projection strip C decrease gradually. Thus, capable of accommodating such locations as a location where the corrugated tube 1 is not desired to be bent, a location where the corrugated tube 1 is desired to be bent more than a prescribed curvature, and a location where the corrugated tube 1 is desired to be bent less than the prescribed curvature, the corrugated tube 1 can reduce the number of fixing members used and thereby suppress increase of the number of work steps.

In addition, since the first half-circumference portion 1a of the rigid portion 10 which is a tube end portion has a recess/projection-repetitive structure, it is not difficult to attach a rotary clamp to it. Furthermore, the first half-circumference portion 1a of all of the rigid portion 10, the gradually varying portion 30, and the bellows portion 20 has a recess/projection-repetitive structure, reduction in design performance can be suppressed by installing the corrugated tube 1 so that this surface is visually recognized by a user.

That is, the embodiment makes it possible to suppress increase of the number of work steps by reducing the number of fixing members used, facilitate attachment of a rotary clamp, and suppress reduction of design performance.

Furthermore, capable of accommodating such locations as a location where the corrugated tube 1 is not desired to be bent, a location where the corrugated tube 1 is desired to be bent more than a prescribed curvature, and a location where the corrugated tube 1 is desired to be bent less than the prescribed curvature, the corrugated tube 1 makes it unnecessary to use a corrugated tube guide (i.e., a route restriction member to be inserted in the corrugated tube 1) and hence can prevent reduction in the space occupation ratio of such members as the electric cables W in the corrugated tube 1. Further, a phenomenon that element wires of an electric cable W are cut apart by the corrugated tube guide's coming into contact with the electric cable W. In addition, since no work of inserting a corrugated tube guide through the corrugated tube 1 is necessary, the efficiency of work of attaching the wire harness WH can be increased.

Since the second half-circumference portion 1b of the rigid portion 10 and the gradually varying portion 30 has the slant portions IP in which the height of the projection strip C decreases gradually, portions that are made thin when the corrugated tube 1 is molded are not prone to be formed around the boundaries between the recess/projection-repetitive structure and the second half-circumference portion 1b, whereby reduction in impact resistance can be suppressed.

In the wire harness WH according to the embodiment, when the slide door SD is fully open, the first half-circumference portion 1a of the corrugated tube 1 is directed a little upward on the side of the opening of the slide door SD. Thus, when the slide door SD is fully open and hence the corrugated tube 1 is visually recognized easily, since the first half-circumference portion 1a faces the side of the point of view of a user, reduction in design performance of the weather strip WS can be suppressed.

Although the invention has been described above by way of the embodiment, the invention is not limited to the embodiment but can be modified without departing from the spirit and scope of the invention.

For example, although in the embodiment the corrugated tube 1 is used for the slide door SD, the invention is not limited to this case. The corrugated tube 1 may be used in other locations or things other than a vehicle. The rigid portion 10 may be formed on the side of the slide door SD as well as on the side of the vehicle main body. Furthermore, although in the embodiment the outer radius of the part, having a straight structure, of the second half-circumference portion 1b is the same as that of the bottoms of the grooves R of the first half-circumference portion 1a, the invention is not limited to this case. It may be the same as the radius of the tops of the projection strips C or have a medium value between the radius of the bottoms of the grooves R of the first half-circumference portion 1a and that of the tops of the projection strips C.

Figure 7A:
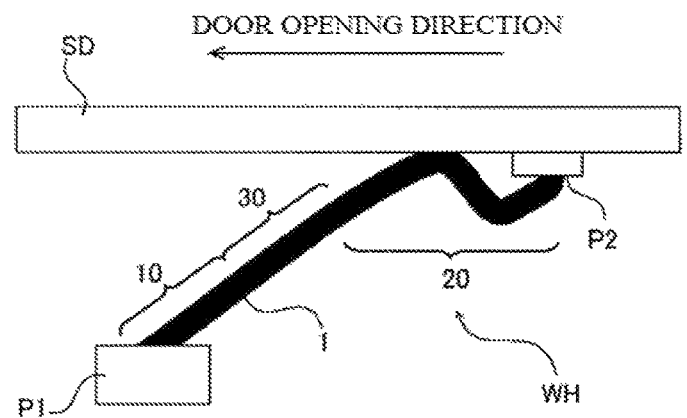
FIG. 7A shows a state of the wire harness including a corrugated tube according to another embodiment of the present invention, and is a top view showing a state that the slide door is fully closed.
Figure 7B:
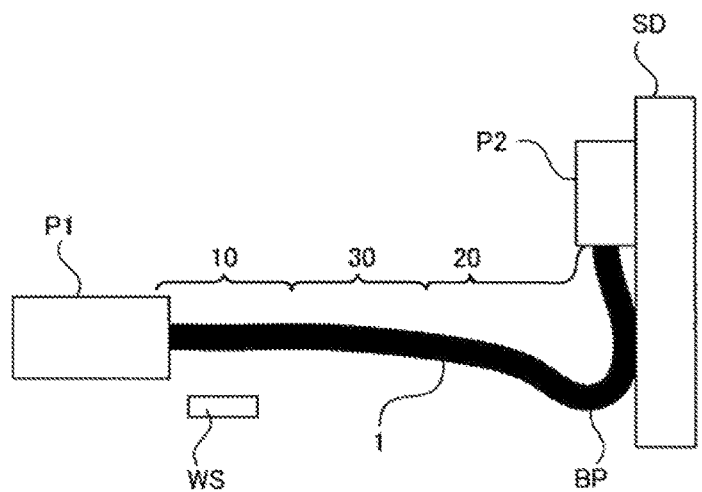
FIG. 7B shows a state of the wire harness including a corrugated tube according to another embodiment of the present invention, and is a side view showing a state that the slide door is half open.

FIGS. 7A and 7B show a wire harness WE including a corrugated tube 1 according to a modification; FIG. 7A is a top view showing a state that the slide door SD is fully closed, and FIG. 7B is a side view showing a state that the slide door SD is half open.

As shown in FIG. 7A, in the corrugated tube 1, the rigid portion 10 and the gradually varying portion 30 extend long. As a result, the corrugated tube 1 extends straightly from the first protector P1 and interferes with the slide door SD. Furthermore, as shown in FIG. 7B (side view), the corrugated tube 1 is bent excessively to form a bent portion BP.

Thus, it is preferable that as shown in FIGS. 5A and 5B the lengths of the rigid portion 10 and the gradually varying portion 30 be such that the corrugated tube 1 does not come into contact with the slide door SD. However, the invention does not deny the corrugated tube 1 as shown in FIGS. 7A and 7B in which the rigid portion 10 and the gradually varying portion 30 extend long.

The invention claimed is:
1. A tubular corrugated tube inside of which a conductor line is to be arranged, the corrugated tube comprising:

a rigid portion which is formed in an end portion in a longitudinal direction of the tube, and has a first half-circumference portion having a recess/projection-repetitive structure in which grooves and projection strips extending in a circumferential direction of the tube are arranged alternately in the longitudinal direction of the tube and a second half-circumference portion that is the remaining part other than the first half-circumference portion and has a straight structure having no grooves or projection strips;

a bellows portion which is formed in a center portion in the longitudinal direction of the tube, and has the first half-circumference portion and the second half-circumference portion both of which have the recess/projection-repetitive structure; and a gradually varying portion which is formed between the rigid portion and the bellows portion in the longitudinal direction of the tube and has:

the first half-circumference portion having the recess/projection-repetitive structure, and the second half-circumference portion having a gradually varying structure in which at least two depths of the grooves and heights of the projection strips decrease gradually from the bellows portion to the rigid portion.

2. The corrugated tube according to claim 1, wherein the second half-circumference portion of each of the rigid portion and the gradually varying portion has a slant portion decreasing gradually the height of the projection strip in the first half-circumference portion.

3. A wire harness arranged between a vehicle main body and a slide door comprising:

the corrugated tube according to claim 1; and a conductor line arranged inside the corrugated tube, wherein the first half-circumference portion of the corrugated tube is directed upward on a side of an opening of the slide door when the slide door is fully open.

* * * * *